United States Patent [19]

Theurer et al.

[11] Patent Number: 5,353,512
[45] Date of Patent: Oct. 11, 1994

[54] MEASURING ARRANGEMENT FOR CONTINUOUSLY MEASURING UNDULATORY IRREGULARITIES OF A RAIL

[75] Inventors: Josef Theurer, Wien; Bernhard Lichtberger, Leonding, both of Austria

[73] Assignee: Franz Plasser Bahnbaumaschinen-Industriegesellschaft m.b.H., Wien, Austria

[21] Appl. No.: 972,173

[22] Filed: Nov. 4, 1992

[30] Foreign Application Priority Data

Nov. 13, 1991 [AT] Austria ............... A 2249/91

[51] Int. Cl.⁵ ............................... B61K 9/08
[52] U.S. Cl. ........................... 33/523.2; 33/1 Q; 33/651.1
[58] Field of Search ............. 33/1 Q, 287, 338, 523, 33/523.1, 523.2, 651, 651.1, 702, 703; 352/376; 73/104, 105, 146

[56] References Cited

U.S. PATENT DOCUMENTS

| | | | |
|---|---|---|---|
| 2,113,785 | 4/1938 | Drake et al. | 33/523.2 |
| 3,056,209 | 10/1962 | Oliver | 33/523 |
| 3,266,302 | 8/1966 | Spangler et al. | 73/105 |
| 3,517,307 | 6/1970 | Wallen, Jr et al. | 33/523.2 |
| 4,040,738 | 8/1977 | Wagner | 33/287 |
| 4,148,027 | 4/1979 | Nowogrodzki | 73/146 |
| 4,288,855 | 9/1981 | Panetti | |
| 4,417,466 | 11/1983 | Panetti | 33/523 |
| 4,473,319 | 9/1984 | Spangler | 73/146 |
| 4,573,131 | 2/1986 | Corbin | 33/1 Q |
| 4,896,964 | 1/1990 | Kitazume | 73/146 |
| 4,922,752 | 5/1990 | Kitazume et al. | |
| 5,199,176 | 4/1993 | Theurer et al. | 33/523.1 |

FOREIGN PATENT DOCUMENTS

| | | |
|---|---|---|
| 385354 | 3/1988 | Austria. |
| 390626 | 6/1990 | Austria. |
| 2606149 | 9/1976 | Fed. Rep. of Germany. |
| 3047667 | 9/1981 | Fed. Rep. of Germany. |

*Primary Examiner*—Thomas B. Will
*Attorney, Agent, or Firm*—Meltzer, Lipper, Goldstein et al.

[57] ABSTRACT

A measuring arrangement (2) for continuously measuring undulatory irregularities in the running surface (4) of a rail (5) of a track (6) comprises a measuring trolley (1) having flanged wheels (8) which are able to roll on the track (6) and a trolley frame (7), and a distance detector (20) disposed on the trolley frame (7) for the contactless measurement of the distance from the rail (5), and a device (11) for recording, processing and issuing measurement signals. The distance detector (20) is mounted in a linear guide (13) connected to the trolley frame (7) so as to be displaceable in the vertical direction relative to the trolley frame (7) and so as to be vibration-damped.

9 Claims, 1 Drawing Sheet

MEASURING ARRANGEMENT FOR CONTINUOUSLY MEASURING UNDULATORY IRREGULARITIES OF A RAIL

BACKGROUND OF THE INVENTION

The invention relates to a measuring arrangement for continuously measuring undulatory irregularities, more particularly rail corrugations, in the running surface of a rail of a track, comprising a measuring trolley having flanged wheels which are able to roll on the track and a trolley frame, and a distance detector arranged on the trolley frame for the contactless measurement of the distance from the rail, and also comprising a device for recording, processing and issuing the measurement signals.

For reasons which are partially still unresearched, corrugations and longer undulations may appear on railway rails laid in tracks as a result of wear. By corrugations are generally meant short-wave periodic irregularities of the running surface of a rail with amplitudes of up to about 0.4 mm and wavelengths of up to about 100 mm (this maximum length can also be up to 500 mm—depending on how it is viewed). Since these deformations become worse with the passage of time and cause progressively increasing damage to the permanent way and to rolling stock, it is important to carry out regular measurements in order to determine the most economically efficient time to eliminate the corrugations, e.g. by rail grinding.

A measuring arrangement for measuring rail corrugations and also longer undulations in the surface of a rail is already known—according to U.S. Pat. No. 4,288,855, in which a measuring trolley provided with flanged wheels is pulled by a railway vehicle along the railway at a given speed. Arranged above a rail on the frame of the measuring trolley or spaced apart from one another in the longitudinal direction of the rail are two (or in another form of construction, three) distance detectors designed as contactless electronic pickups and operating on the eddy-current principle. The amplitudes of the corrugations or undulations within a specific wavelength range may be measured by means of these detectors. The distance apart of the detectors or pickups is in this case smaller than the shortest wavelength occurring within this selected wavelength range. The pickups are connected to a measurement circuit which with the aid of a comparator forms the difference of the two measured distances and at the same time determines the average actual length of the detected wave. From these data—taking into account a transfer coefficient which is a function of the ratio of the distance between pickups to the wavelength—the amplitude of the rail deformation can be determined as an actual value. Because the distance detectors are attached to the trolley frame, the said trolley frame acts as a reference base to which the measured distances from the rail are related. Since this reference base is itself directly supported on the track, however, its position relative to the track is influenced and altered by track faults which are present—or even by the corrugations and undulations themselves—by which the measurement results are adulterated to a certain extent and cannot count as absolute values. It is true that the measurement errors can be reduced by lengthening the measuring base, but they can never be eliminated completely.

A further measuring arrangement—known from Austrian Patent Specification 390 626—has a frame which rests on the track to be measured by way of rollers arranged at the ends thereof and which serves as the measuring base. Disposed in the center of this measuring base are two angle sensors, one of which measures the angle at which the frame is inclined in an inertial coordinate system. The second angle sensor determines the angle at which a surface element of the rail to be measured is inclined in relation to the frame. This second angle sensor may be designed as a scanning element or even—if the rail surface is sufficiently reflective—operate contactlessly on the principle of an autocollimation optical system. In this, a light beam is directed at the rail and its reflection is reproduced on a detector, e.g. a position-sensitive photodiode. An evaluating circuit adds the output signals of the angle sensors and integrates them over the distance covered by the arrangement. The value obtained in this way corresponds to the profile curve averaged over the length of the measured surface element. The measurement accuracy with this measuring arrangement is equally adversely affected by any irregularities of the rail in the area of the contact points of the rollers.

Disclosed in U.S. Pat. No. 4,922,752 is an arrangement for measuring or recording the irregularities of a road surface. A four-wheeled, elongated vehicle has a sensor attached to its underside in its central region, the said sensor consisting of a laser transmitter directed at the road surface and a CCD receiver. An encoder associated with one of the wheels measures the distance covered. The data obtained are recorded by means of a recorder provided on the vehicle. In this case too, the attachment of the sensor directly to the vehicle frame has an unfavorable effect, as interfering natural frequencies of the vehicle may adversely affect the measurement accuracy of the arrangement.

The object of the present invention lies in developing a measuring arrangement for rail corrugations which produces measurement results which are more accurate and more reliable and which are simpler to process.

SUMMARY OF THE INVENTION

This object is achieved with an arrangement according to the invention in that a distance detector is mounted in a linear guide connected to the trolley frame so as to be displaceable in the vertical direction relative to the trolley frame and so as to be vibration-damped.

The particular advantage of such an arrangement or mounting of the distance detector lies in the fact that it can thereby be isolated to the greatest possible extent from interfering influences which affect the measurement accuracy. Such influences consist, for example, of the various kinds of vibration into which the trolley frame of the measuring trolley is set when the flanged wheels thereof travel over an uneven rail surface. This of course is particularly the case in the measurement of corrugations as here the frequent occurrence of undulatory irregularities on the rail is to be expected, preventing the trolley frame from being able to be used as a reliable and constant-remaining measuring base. The vibration-damped mounting creates, as it were, an inertial system for the distance detector which is independent of the measuring trolley, the distance detector in this way being able to determine the distance from the running surface of the rail continuously—specifically at the higher speed of the measurement run—relatively undisturbed by vibrations. The linear guide ensures that the detector is only mobile in the vertical direction, while its horizontal position, particularly in relation to the rail surface to be measured, remains unchanged and thus ensures uninterrupted measurement.

A further development of the invention enables, in a manner which is unexpected, the rail corrugations to be recorded with respect to their shape virtually undistorted. The auxiliary mass oscillates at a very low frequency as a result of mass inertia and absorbs the vibrations and oscillations transmitted by the measuring trolley or trolley frame. Accordingly, the measurement signal delivered by the distance detector consists of two components: the slow and relatively constant oscillation of the auxiliary mass and the in contrast relatively fast changes of the distance signal of the measured corrugations, the speed of these changes being in direct relation to the speed of the measurement run. Technically it is no problem to separate these signal components which are superimposed on one another or to filter out the corrugation measurement signal, which then corresponds to the true shape of the corrugations.

In an embodiment, the two rails of the track are advantageously measured in a single measurement run using proven and reliable laser technology.

A further embodiment includes a distance-measuring wheel having a priority encoder for delivering distance pulses. This enables the corrugation distance measurements to be associated with length and further enables the corrugations to be recorded undistorted with respect to their position as well.

In a further embodiment, a high pass filter, for instance a Butterworth filter of the fourth order with a cut-off frequency of 2 Hz, is provided via which the measurement signals are passed for processing. The high pass filter can reliably isolate out the relevant corrugation signal from the multi-component signal, this then being recorded by the recorder as a correct scale image of the rail corrugations as it were.

Finally, in a further development of the invention, the measuring arrangement can also be used in the conventional manner for performing so-called versine measurement.

BRIEF DESCRIPTION OF THE DRAWING

The invention is described in detail below with the aid of an embodiment represented in the drawings, wherein.

DETAILED DESCRIPTION OF AN EMBODIMENT

Figure 1:
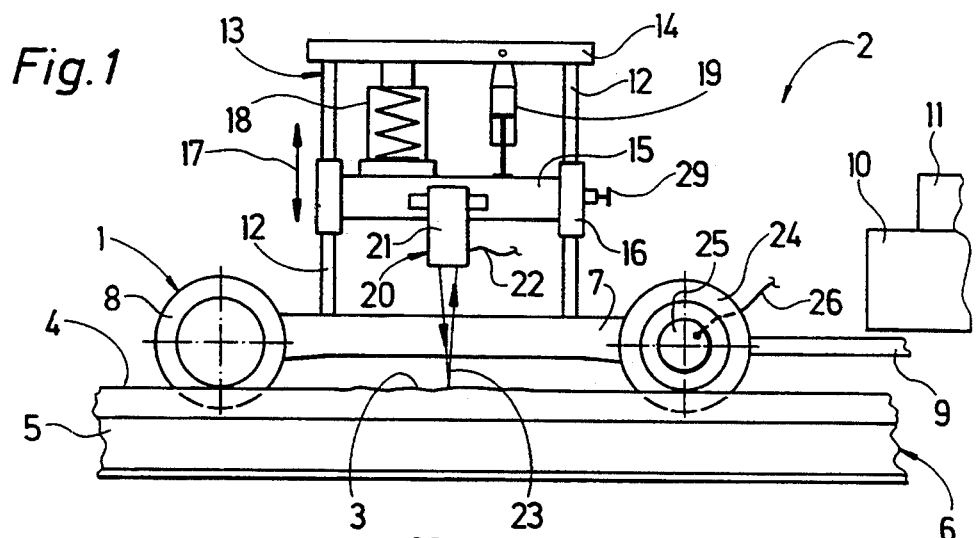
FIG. 1 shows a side view of a measuring trolley, designed according to the invention, of a measuring arrangement for measuring rail corrugations.
Figure 2:
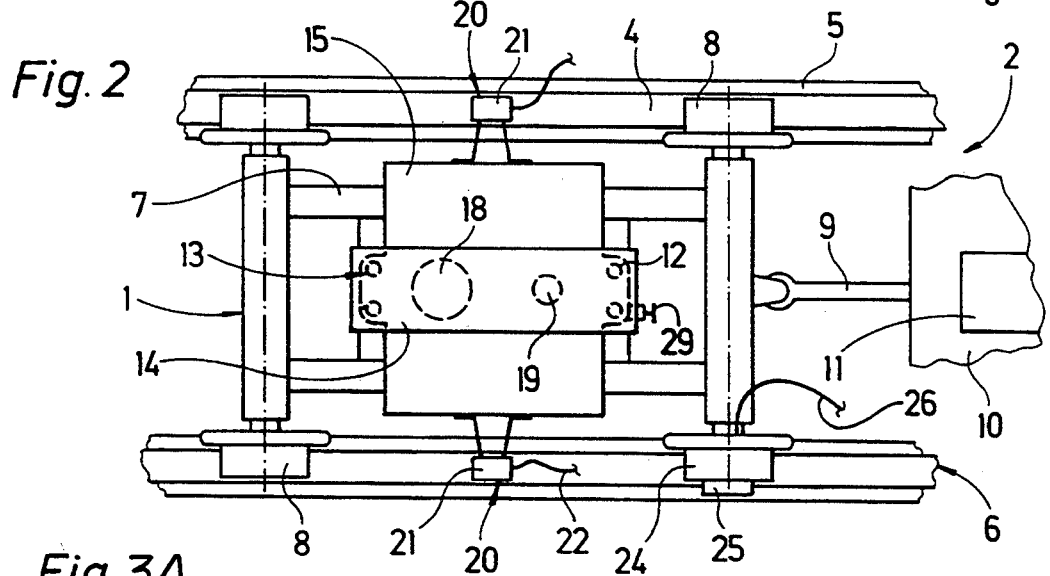
FIG. 2 shows a plan view of the measuring trolley according to FIG. 1.
Figure 3A:
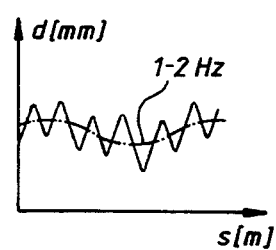
FIG. 3 shows a schematic representation of the measurement signal sequence with diagrams explaining the signal processing.
Figure 3B:
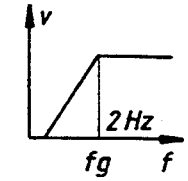
Figure 3C:
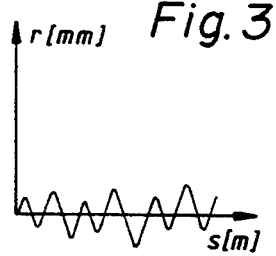
Figure 3D:
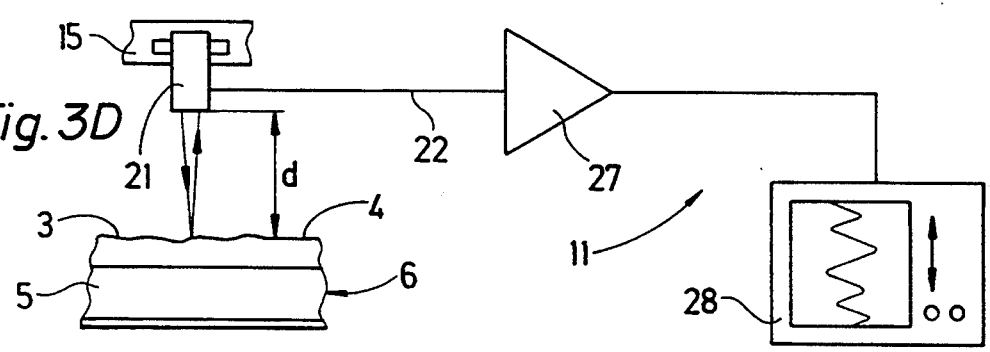

Apparent in FIG. 1 and 2 is a measuring trolley 1 which is part of a measuring arrangement 2 for continuously measuring corrugations 3 in the running surface 4 of a rail 5 of a railway track 6. The measuring trolley 1 has a trolley frame 7 and flanged wheels 8 which are able to roll on the rails 5 and is coupled by way of a wagon shaft 9 with a vehicle 10—not shown in detail—which is movable on the track 6. Further located on the said vehicle is a device 11 for recording, processing and issuing measurement signals which is described in more detail later with the aid of FIG. 3.

Disposed on the trolley frame 7 is a linear guide 13 consisting of vertical guide rods 12 which are spaced apart from one another. The upper ends of the guide rods 12 are interconnected and stabilized by means of a beam 14 extending in the longitudinal direction of the trolley. Situated between the guide rods 12 or between the trolley frame 7 and the beam 14 is an auxiliary mass 15 which is mounted so as to be displaceable in the vertical direction on the linear guide 13 by means of sliding sleeves 16 (see arrow 17 in FIG. 1). The auxiliary mass 15 is connected to the beam 14 or spring-suspended therefrom by way of a pneumatic spring 18. A damper 19 is similarly arranged between the auxiliary mass 15 and the beam 14 and retards or brakes the vertical oscillatory movement of the auxiliary mass. The auxiliary mass 15, the supporting capacity of the pneumatic spring 18 and the effect of the damper 19 are of such a magnitude or so adjusted to one another that—as the measuring trolley 1 moves along the track 6—the auxiliary mass oscillates as a result of mass inertia (inertial system) at a natural frequency of about 1 to 2 Hz.

On the two longitudinal sides of the measuring trolley 1 facing one another in the transverse direction of the track respective contactlessly-operating distance detectors 20 are attached to the auxiliary mass 15 and—in order to measure the distance away from the rail—are arranged so as to be exactly centered over the running surface 4 of each rail 5. In the present embodiment, the distance detectors are designed as laser distance-measuring devices 21, connected by way of a signal line 22 to the device 11 on the vehicle 10 and able to measure precisely the distance from the running surface 4 of the rail by means of a laser beam 23 directed towards it and reflected. One of the flanged wheels 8 is further designed as a distance-measuring wheel 24 and is provided with a priority encoder 25 to deliver distance pulses which are passed on via a signal line 26 to the device 11 for processing.

The way in which the measuring arrangement 2 operates is now explained with the aid of the measurement signal sequence schematically represented in FIG. 3. The laser distance-measuring device 21 continuously measures the distance d from the running surface 4 of the rail 5 while it is moved along the track 6 at a measuring speed of 10 km/h for example. If rail corrugations 3 are present, the distance d changes with a frequency f which is a function of the corrugation length. If the length of the corrugations, measured in the longitudinal direction of the track, is between about 5 cm and 50 cm for example, the result at the said measuring speed is a measuring frequency f of about 5 to 60 Hz, at which frequency the measurement signal is conveyed via the signal line 22. This measuring frequency still has superimposed on it the low natural oscillation frequency of 1 to 2 Hz of the auxiliary mass 15 to which the laser distance-measuring device 21 is firmly connected. Diagram A shows this multi-component signal, d[mm] being the measured distance in millimeters and s[m] being the distance covered in meters recorded by the distance-measuring wheel 24 or the priority encoder 25.

The signal then passes to an electronic high pass filter 27 associated with the device 11, e.g. a Butterworth filter of the 4th order, with a cut-off frequency of 2 Hz, which has the task of separating the two components of the multi-component measurement signal. Diagram B illustrates the filter characteristic of the high pass filter 27, according to which all frequencies f lying below a cut-off frequency fg of 2 Hz are filtered out. Only the higher frequencies are fully amplified (v) and passed on to a recorder 28—for recording or for output. Diagram C shows the resulting measurement signal which now corresponds, undistorted, to the corrugations 3 both with respect to their height r in millimeters and also their lengthwise position. Instead of the recorder 28, a different recording device would also be possible, such as a computer for instance, in which the measurement data can be further processed. Possible options for further processing of this kind would be, for example, calculation of the average amplitude of the corrugations or calculation of the proportional wavelengths and amplitudes by means of the Fourier transform (formation of the frequency spectrum). The measuring speed of the arrangement is virtually only limited by the speed of the data output.

The measuring arrangement may, moreover, also be used for performing corrugation measurement in the form of versine measurement. To do this, the auxiliary mass 15 is fixed on the linear guide 13 by means of a locking device 29 (FIG. 1), causing the distance detector 20 to be firmly joined to the trolley frame 7. This then becomes the reference base for the corrugation measurement in the conventional manner.

While the invention has been described by reference to a specific embodiment, this was for purposes of illustration only. Numerous alternative embodiments will be apparent to those skilled in the art and are considered to be within the spirit and the scope of the invention.

We claim:

1. A measuring arrangement for continuously measuring undulatory irregularities in a running surface of a rail of a track, comprising
    a measuring trolley having flanged wheels which roll on said track, and a trolley frame,
    a distance detector located on said trolley frame above said rail for contactless measurement of the distance of said detector to said rail, and
    means connected to said distance detector for recording, processing and issuing measurement signals,
    wherein said distance detector is mounted on a linear guide connected to said trolley frame so as to be displaceable in a vertical direction relative to said trolley frame and, said measuring arrangement further including means for vibration-damping of the distance detector along the linear guide during a measuring operation.

2. The measuring arrangement of claim 1 wherein said vibration-damping means comprises an auxiliary mass mounted on said linear guide by means of a yielding spring and a damper so as to be vertically displaceable relative to said trolley frame, said distance detector being connected to said auxiliary mass.

3. The measuring arrangement of claim 2 wherein said yielding spring is a pneumatic spring.

4. The measuring arrangement of claim 2 wherein said auxiliary mass has a natural oscillation frequency of about 1 to 2 Hz.

5. The measuring arrangement of claim 1 wherein said distance detector comprises a pair of laser distance measuring devices each of which is disposed on a longitudinal side of said trolley frame above the running surface of each rail of said track.

6. The measuring arrangement of claim 1 further comprising a distance measuring wheel for measuring a longitudinal distance along said track having a priority encoder for delivering distance signals to said recording, processing and issuing means.

7. The measuring arrangement of claim 1 wherein said recording, processing and issuing means includes a filter for filtering signals produced by said distance detector.

8. The measuring arrangement of claim 7 wherein said filter comprises an electronic high pass filter.

9. The measuring arrangement of claim 2 further comprising a locking device for detachably fixing said auxiliary mass to said linear guide.

* * * * *